United States Patent
Kotov et al.

(10) Patent No.: US 11,755,426 B2
(45) Date of Patent: Sep. 12, 2023

(54) AUTOMATIC RECOVERY OF LOCKING FILESYSTEM SHARED BETWEEN VIRTUAL TAPE LIBRARY NODES

(71) Applicant: EMC IP HOLDING COMPANY LLC, Hopkinton, MA (US)

(72) Inventors: Yuri Kotov, Saint Petersburg (RU); Andrey Markov, Saint Petersburg (RU)

(73) Assignee: Dell Products L.P., Hopkinton, MA (US)

(*) Notice: Subject to any disclaimer, the term of this patent is extended or adjusted under 35 U.S.C. 154(b) by 118 days.

(21) Appl. No.: 17/246,761

(22) Filed: May 3, 2021

(65) Prior Publication Data
US 2022/0350711 A1 Nov. 3, 2022

(51) Int. Cl.
*G06F 7/00* (2006.01)
*G06F 17/00* (2019.01)
*G06F 11/14* (2006.01)
*G06F 16/176* (2019.01)
*G06F 16/178* (2019.01)
*G06F 16/188* (2019.01)
*G06F 16/182* (2019.01)

(52) U.S. Cl.
CPC ........ *G06F 11/1469* (2013.01); *G06F 16/178* (2019.01); *G06F 16/1774* (2019.01); *G06F 16/183* (2019.01); *G06F 16/188* (2019.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 2010/0058465 | A1* | 3/2010 | Johnson | G06F 3/0605 711/E12.001 |
| 2010/0299673 | A1* | 11/2010 | Shultz | G06F 12/084 718/104 |
| 2014/0164326 | A1* | 6/2014 | Slater | G06F 11/1456 707/624 |

* cited by examiner

*Primary Examiner* — Tuan A Pham
(74) *Attorney, Agent, or Firm* — ANDERSON GORECKI LLP

(57) ABSTRACT

A virtual tape library system includes multiple copies of a LockFS that are mounted on all nodes. One of the LockFSs is designated as the active copy. A primary node manages recovery when a secondary node signals loss of connectivity with the active copy by posting a sync request file to at least one of the LockFSs. The primary node posts status request files to the LockFSs and the secondary nodes respond by writing status to the status request files. A LockFS that is reachable by all nodes is selected as the new active LockFS. Switchover is accomplished by the primary node posting a disable request file to the selected LockFS and waiting for all secondary nodes to acknowledge by writing to the disable request file. The primary node then posts an activate request file to the selected LockFS and waits for all secondary nodes to acknowledge by writing to the activate request file.

9 Claims, 16 Drawing Sheets

Primary Node Checks LockFS Availability

AUTOMATIC RECOVERY OF LOCKING FILESYSTEM SHARED BETWEEN VIRTUAL TAPE LIBRARY NODES

TECHNICAL FIELD

The present disclosure is generally related to data storage, and more particularly to virtual tape library locking filesystems.

BACKGROUND

Tape drives read and write data that is stored on magnetic tape. Tape drives were at one time commonly used with mainframe computers for data archive because of advantages such as lower cost per bit of storage capacity and better stability than Hard Disk drives (HDDs). Magnetic tape was not typically used for purposes other than data archive once HDDs became available because tape drives have greater input-output (10) latency than HDDs, must be sequentially accessed, and may have to be manually retrieved from storage and mounted in a tape drive to be accessed.

Tape archive systems continue to be used with mainframe computers, but tape drives have mostly been replaced by virtual tape drives. A virtual tape drive is a specialized compute node that simulates a tape drive but uses non-tape storage media. From the perspective of a mainframe computer, a virtual tape drive functions and responds to tape access commands like a real tape drive. However, HDDs or solid-state drives (SSDs) may be used to store a virtual tape library of virtual tape volumes rather than a physical library of magnetic tapes. Because HDDs and SSDs have better IO performance than magnetic tape, virtual tape drives provide better IO performance than real tape drives. Further, virtual tape drives typically support legacy tape drive backup and recovery processes and policies, thereby providing the advantages of faster data backup and restoration.

A virtual tape library system may include multiple virtual tape nodes such as virtual tape drives. All of the nodes have shared access to the same virtual tape files and filesystems. Synchronization between the nodes is required to perform operations such as initializing a new tape, renaming an existing tape, and moving a tape between filesystems. Without synchronization, two different nodes might create conflicts such as by simultaneously initializing two tapes with the same name in different filesystems of same virtual tape library. To prevent such problems the virtual tape library system uses a special locking filesystem (LockFS). The LockFS is mounted to all nodes from a single storage resource. This is problematic because that storage resource presents a single point of failure and if the LockFS becomes unavailable then functions such as initializing new tapes and moving tapes between virtual tape library filesystems to perform space usage balancing cannot be performed.

SUMMARY

All examples, aspects and features mentioned in this document can be combined in any technically possible way.

In accordance with some implementations, a virtual tape library system comprises: a primary virtual tape server configured to select an active copy of a shared locking filesystem from a plurality of copies of the shared locking filesystem; and a plurality of secondary virtual tape servers configured to use the active copy of the shared locking filesystem selected by the primary virtual tape server, and signal to the primary virtual tape server responsive to the active copy of the shared locking filesystem becoming unreachable.

In accordance with some implementations, a method for shared locking filesystem recovery in a virtual tape library system comprises: a primary virtual tape server selecting an active copy of a shared locking filesystem from a plurality of copies of the shared locking filesystem; a plurality of secondary virtual tape servers using the active copy of the shared locking filesystem selected by the primary virtual tape server; at least one of the secondary virtual tape servers signaling to the primary virtual tape server responsive to the active copy of the shared locking filesystem becoming unreachable; and the primary virtual tape server selecting a different one of the copies of the shared locking filesystem as a new active copy of the shared locking filesystem.

In accordance with some implementations, an apparatus comprises: a virtual tape server configured to use a first copy of a shared locking filesystem selected from a plurality of copies of the shared locking filesystem and to use a second one of the copies of the shared locking filesystem rather than the first copy responsive to an indication that the first active copy of the shared locking filesystem has become unreachable.

DETAILED DESCRIPTION

Some aspects, features, embodiments, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that simulate, emulate, or abstract other features. The term "physical" is used to refer to tangible features. For example, and without limitation, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Figure 1:
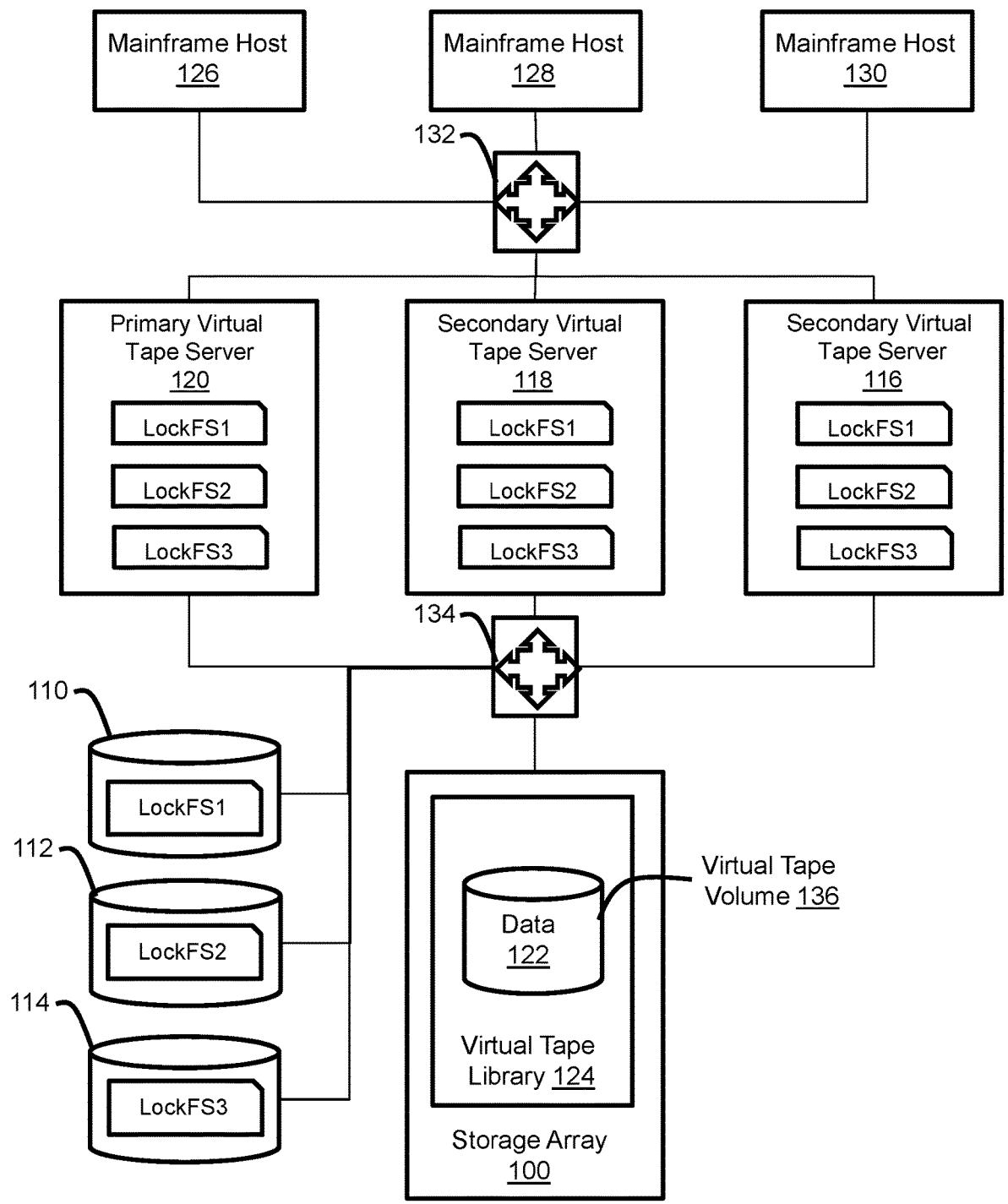
FIG. 1 illustrates a virtual tape library system with automatic recovery of a shared LockFS.

FIG. 1 illustrates a virtual tape library system with automatic recovery of a shared lock filesystem LockFS. The illustrated virtual tape library system includes three virtual tape servers 116, 118, 120, three mainframe host computers 126, 128, 130, a storage array 100, non-volatile storage drives 110, 112, 114, and interconnecting network nodes 132, 134. The mainframe hosts 126, 128, 130 send tape archive protocol commands to the virtual tape servers 116, 118, 120 to access data 122 in a virtual tape volume 136 of a virtual tape library 124. The virtual tape servers 116, 118, 120 may be referred to as virtual tape drives or virtual tape nodes. Virtual tape server 120 is designated as the primary node. Virtual tape servers 116, 118 are designated as the secondary nodes. The primary node manages the LockFS automatic recovery process as will be explained in greater detail below.

The virtual tape servers 116, 118, 120 are configured to simulate real tape backup appliances. Each virtual tape server receives tape drive utility access commands, such as tape read and tape write, that are sent by the mainframe hosts 126, 128, 130. Each virtual tape server is responsive to the tape drive utility access commands to generate corresponding IOs to access the storage resources of the storage array 100. IOs from the virtual tape servers may identify virtual tape volume data based on, for example and without limitation, filenames, logical block addresses, or some other metadata. However, the storage array is block-based. Thus, the virtual tape servers translate between tape drive utility access commands and a different IO format to which the storage array is responsive, thereby enabling the storage resources of the storage array 100 to be used to maintain the virtual tape library 124 in which the virtualized tape data 122 is stored.

The LockFS is a data structure that describes how the data 122 of the associated virtual tape volume 136 is stored. For example, and without limitation, the LockFS may describe a directory structure with specific files located in specific directories, various information describing attributes of individual directories and files including but not limited to create and modification timestamps, and logical block addresses of the data set, among a variety of things. Virtual tape filesystems may support technologies such as Network File System (NFS) and Multi-Protocol File System (MPFS), and protocols such as File Transfer Protocol (FTP), Network Data Management Protocol (NDMP), Trivial File Transfer Protocol (TFTP), and Server Message Block (SMB), for example, and without limitation. Copies of the shared LockFS, labelled LockFS1, LockFS2, and LockFS3, are maintained on different non-volatile drives 110, 112, 114. The number of copies of the shared LockFS that are created and maintained is an implementation detail and the example is merely for context and should not be viewed as limiting. Each copy of the shared LockFS, LockFS1, LockFS2, and LockFS3, is mounted on each of the virtual tape servers 116, 118, 120.

Figure 2:
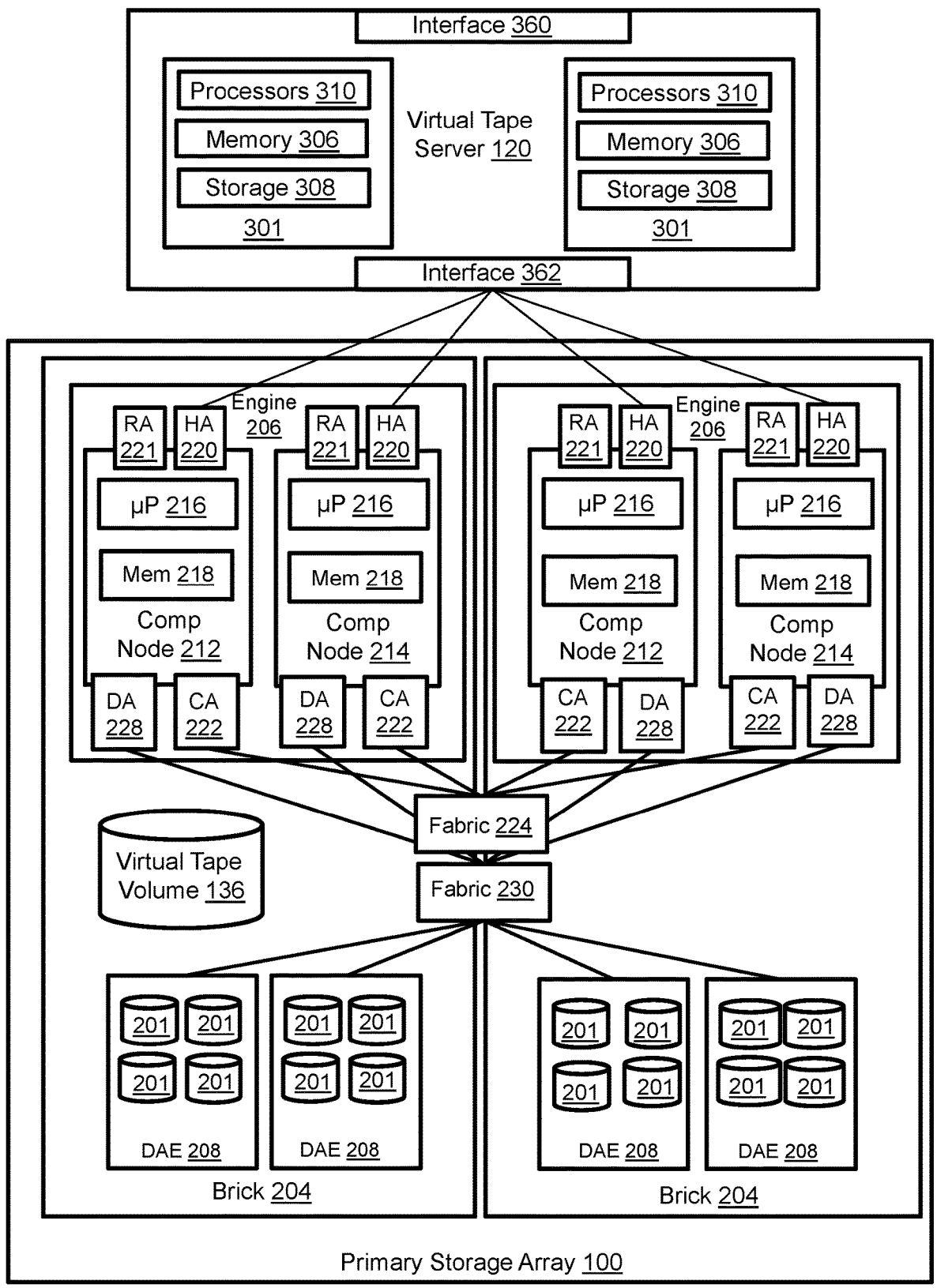
FIG. 2 illustrates one of the virtual tape servers and the storage array in greater detail.

FIG. 2 illustrates one of the virtual tape servers 120 and the storage array 100 in greater detail. All of the virtual tape servers may be identical. The illustrated virtual tape server includes a plurality of compute nodes 301, each having volatile memory 306, persistent storage 308, and one or more tangible processors 310. The volatile memory 306 may include random access memory (RAM) of any type. The persistent storage 308 may include tangible persistent storage components of one or more technology types, for example and without limitation storage class memory (SCM), SSDs such as flash, and HDDs such as Serial Advanced Technology Attachment (SATA) and Fibre Channel (FC). The compute nodes 301 are interconnected via a switch fabric. Interface 360 is adapted to communicate with the mainframe host computers. Interface 362 is adapted to communicate with the storage array.

The storage array 100 includes one or more bricks 204. Each brick includes an engine 206 and one or more drive array enclosures (DAEs) 208. Each engine 206 includes a pair of compute nodes 212, 214 that are interconnected via point-to-point links and arranged in a failover relationship. The compute nodes may be referred to as "storage directors" or simply "directors." Each compute node includes resources such as at least one multi-core processor 216 and local memory 218. The processor may include central processing units (CPUs), graphics processing units (GPUs), or both. The local memory 218 may include volatile media such as dynamic random-access memory (DRAM), non-volatile memory (NVM) such as storage class memory (SCM), or both. Each compute node includes one or more host adapters (HAs) 220 for communicating with the virtual tape servers. Each host adapter has resources for servicing IO commands. The host adapter resources may include processors, volatile memory, and ports via which the hosts may access the storage array. Each compute node also includes a remote adapter (RA) 221 for communicating with other storage systems such as secondary storage array, e.g., for remote mirroring, backup, and replication. Each compute node also includes one or more drive adapters (DAs) 228 for communicating with managed drives 201 in the DAEs 208. Each drive adapter has processors, volatile memory, and ports via which the compute node may access the DAEs for servicing IOs. Each compute node may also include one or more channel adapters (CAs) 222 for communicating with other compute nodes via an interconnecting fabric 224. The managed drives 201 include non-volatile storage media such as, without limitation, solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 230 enables implementation of an N-way active-active backend. A backend connection group includes all drive adapters that can access the same drive or drives. In some implementations every drive adapter 228 in the storage array can reach every DAE via the fabric 230. Further, in some implementations every drive adapter in the storage array can access every managed drive 201.

Data stored in the virtual tape volume 136 is maintained on the managed drives 201. The managed drives 201 are not discoverable by the virtual tape server 120 but the compute nodes 212, 214 create a storage object, i.e., the virtual tape volume, that can be discovered and accessed by the virtual tape server. From the perspective of the virtual tape server, the storage object is a single drive having a set of contiguous logical block addresses (LBAs). However, virtual tape volume data is stored at non-contiguous addresses, possibly on multiple managed drives 201, e.g., at ranges of addresses distributed on multiple drives or multiple ranges of addresses on one drive. The compute nodes maintain metadata that maps between the virtual tape volume and the managed drives 201 in order to process IO commands from the virtual tape volume based on LBAs.

Figure 3:
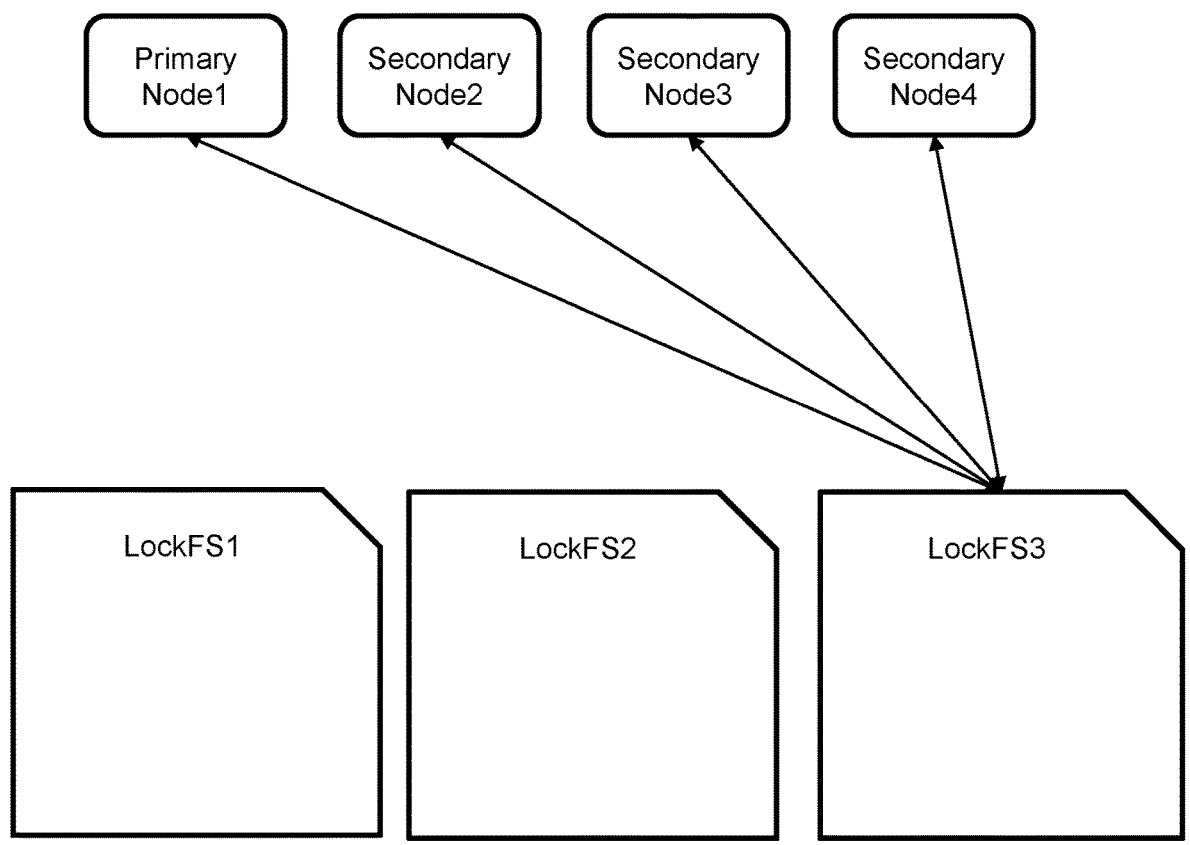
FIG. 3 illustrates an initial state of the virtual tape library system and shared LockFS.

FIG. 3 illustrates an initial state of the virtual tape library system and shared LockFS. A copy of the LockFS designated as LockFS3 is active. The other copies, LockFS1 and LockFS2, are inactive. A primary node1, secondary node2, secondary node3, and secondary node4 each use the active copy LockFS3 for accessing and maintaining the associated virtual tape volume. The inactive copies are updated to maintain consistency with the active copy. Any of the virtual tape servers could be designated as the primary node and any of the copies of the LockFS could be designated as the active copy.

Figure 4:
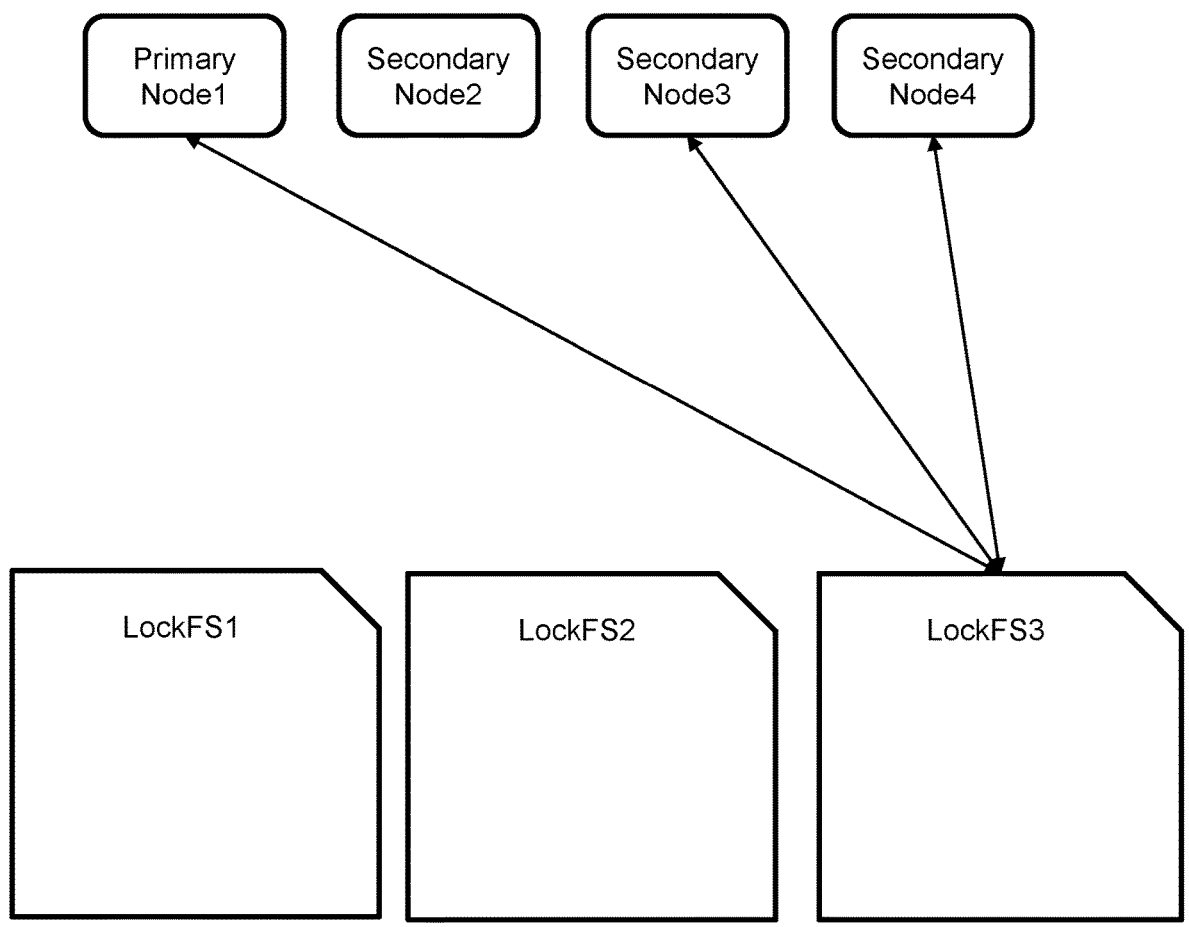
FIG. 4 illustrates loss of connection to the active LockFS by one of the secondary nodes, which triggers automatic recovery.

FIG. 4 illustrates loss of connection to the active LockFS by one of the secondary nodes. Loss of connectivity triggers automatic recovery. In the illustrated example, secondary node2 loses connectivity to the active copy LockFS3. The loss of connectivity may occur for any of a wide variety of reasons including, but not limited to, cabling problems.

Figure 5:
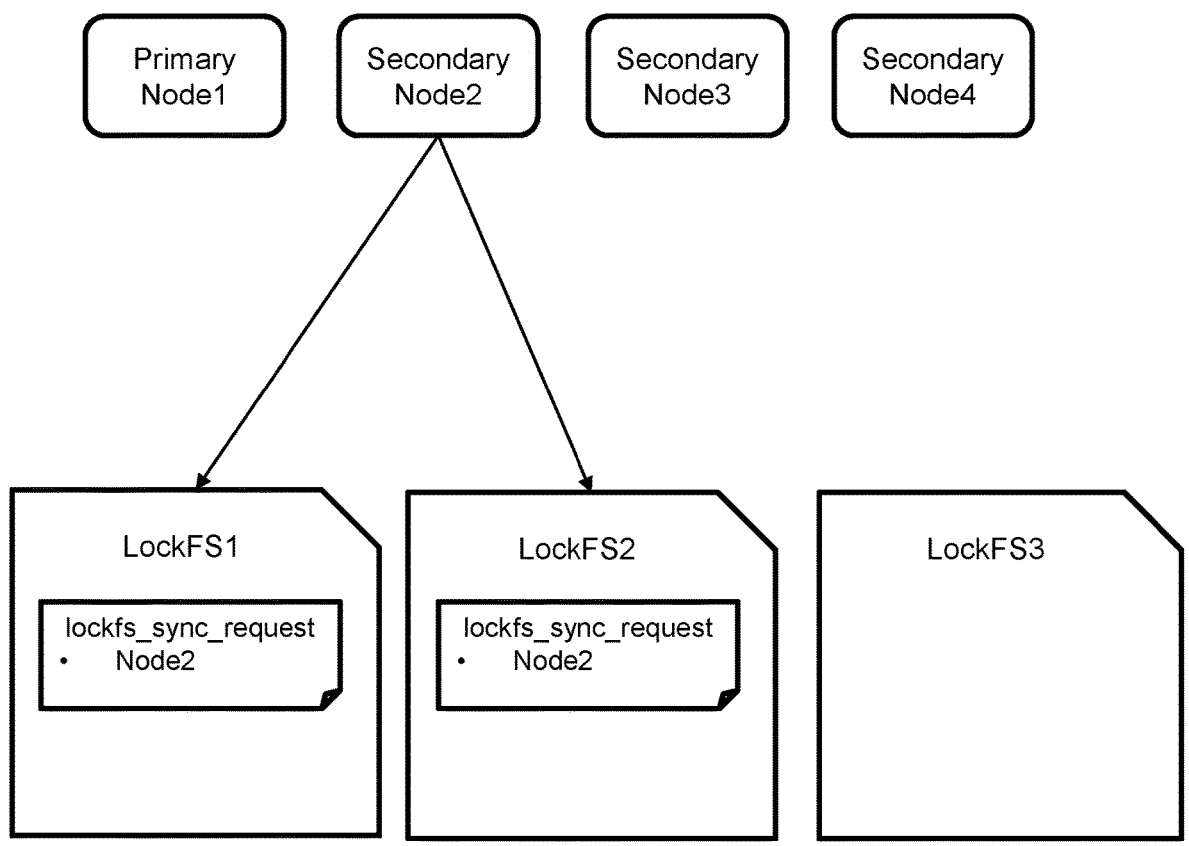
FIG. 5 illustrates sending a sync request to all available LockFSs.

FIG. 5 illustrates the node that has lost connectivity sending a sync request to all available LockFS copies. Each secondary node is configured to generate a lockfs_sync_request in response to detection of loss of connectivity to the active LockFS copy. The lockfs_sync_request and other messages are communicated to the other nodes by writing to one or more available LockFSs. More specifically, messages are communicated in special management files located in the shared LockFS. In the illustrated example, secondary node2 writes a lockfs_sync_request file to LockFS1 and LockFS2, which are the only copies available to node2 because connectivity to LockFS3 has been lost. The lockfs_sync_request may indicate the node that issued the request.

Figure 6:
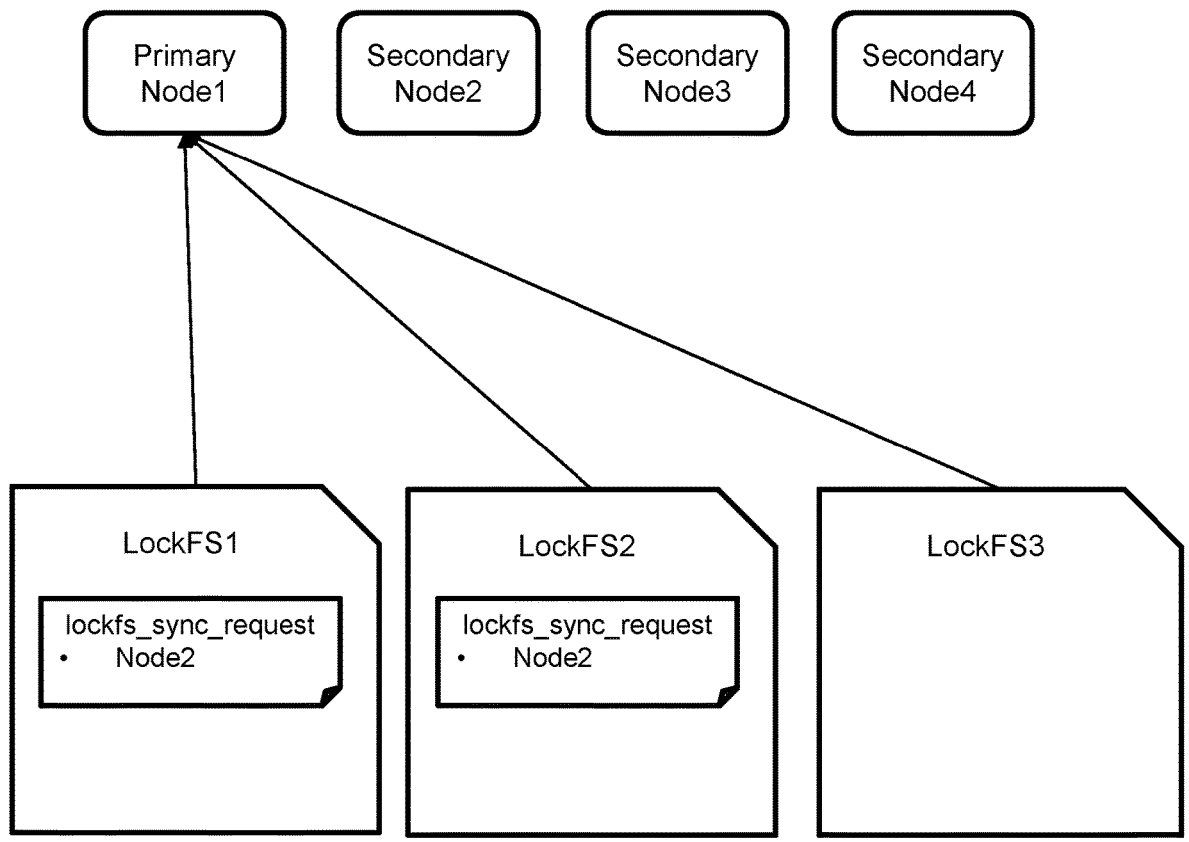
FIG. 6 illustrates the primary node detecting the sync request.

FIG. 6 illustrates the primary node detecting the lockfs_sync_request. All nodes monitor the LockFSs for message files posted by other nodes. In the illustrated example, primary node1 detects and reads the lockfs_sync_request that secondary node2 posted to LockFS1 and LockFS2.

Figure 7:
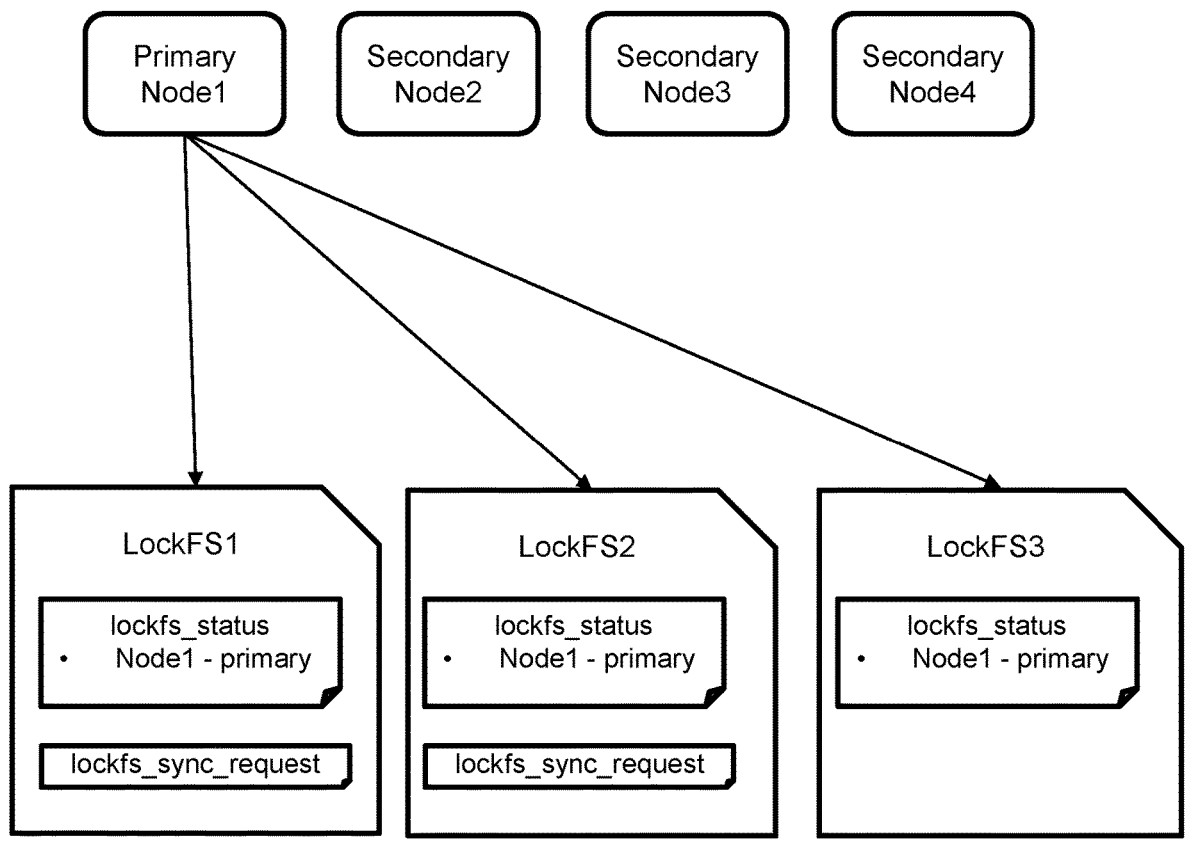
FIG. 7 illustrates the primary node checking LockFS availability.

FIG. 7 illustrates the primary node checking LockFS availability. The primary node1 posts lockfs_status request messages to each copy of the LockFS that can be reached by the primary node. In the illustrated example the primary node1 has connectivity to all LockFS copies and posts lockfs_status files to LockFS1, LockFS2, and LockFS3.

Figure 8:
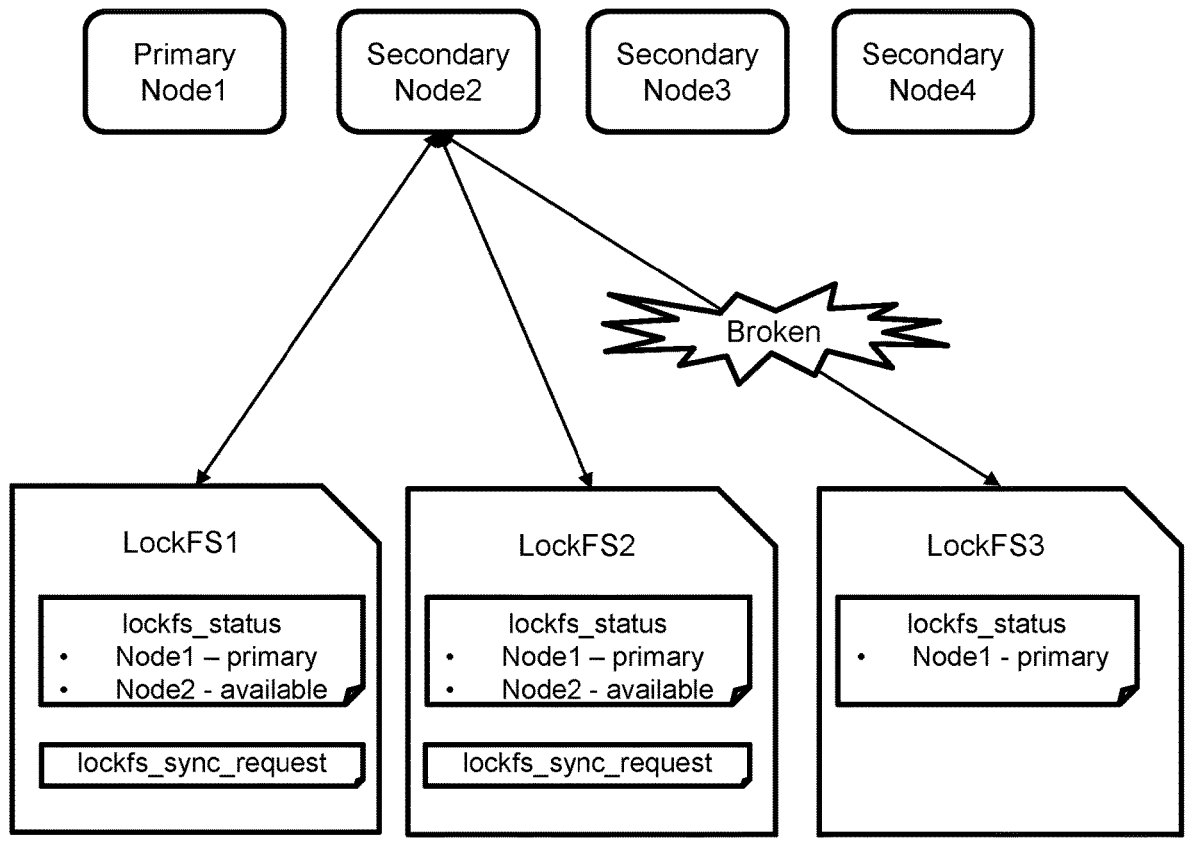
FIG. 8 illustrates the secondary nodes responding to the status check request.

FIG. 8 illustrates the secondary nodes detecting and responding to the lockfs_status request. All secondary nodes monitor all available LockFSs for messages. Each secondary node is responsive to the lockfs_status message to post status to each reachable LockFS copy by writing to the lockfs_status file. The response includes a line with the node ID and status of the LockFS on the current node. In the case of the active LockFS on current node, the status line is "In use," or a similar alternative. Otherwise, the status line is "Available," or a similar alternative. In the illustrated example, secondary node2 posts "Node2 available" messages to the lockfs_status files of LockFS1 and LockFS2. Responses to the lockfs_status message by secondary node3 and secondary node4 are shown in FIG. 9.

The primary nodes waits until the "lockfs_status" files are updated by all nodes with replies. In general, there are three possible reply scenarios. If all secondary nodes indicate current use (and thus reachability) of the current LockFS as the active LockFS, then the primary node removes all created "lockfs_status" files in other LockFSs and continues use of the current LockFS as the active LockFS. This scenario may occur where the loss of connectivity was transient. If at least one node does not use the current LockFS as the active LockFS and at least one node does use it as the active LockFS then the primary node synchronizes LockFS across all nodes using a synchronization procedure described below.

If none of the nodes use the current LockFS and the active LockFS then the primary node waits for "lockfs_status" files in other LockFSs to be completed. This scenario is associated with four possibilities. One of "lockfs_status" files may be filled with all "In use" states. The Primary node would then remove all created "lockfs_status" files in other LockFSs. One of "lockfs_status" files may be completed to indicate both "Available" by at least one node and "In use" by at least one node. The primary node would then initialize synchronizes LockFS across all nodes. If all "lockfs_status" files are filled by all "Available" states, which is possible in the case when the Virtual Tape Library system is just booted up, the primary node initializes synchronization of LockFS across all nodes. If almost all "lockfs_status" files are filled by "Available" states, but at least one "lockfs_status" file wouldn't be finished by all nodes within a timeout, which is possible in the case where LockFS is not available on at least one node, the primary node initializes synchronization of LockFS across all nodes for one of LockFSs which are available on all nodes.

Figure 9:
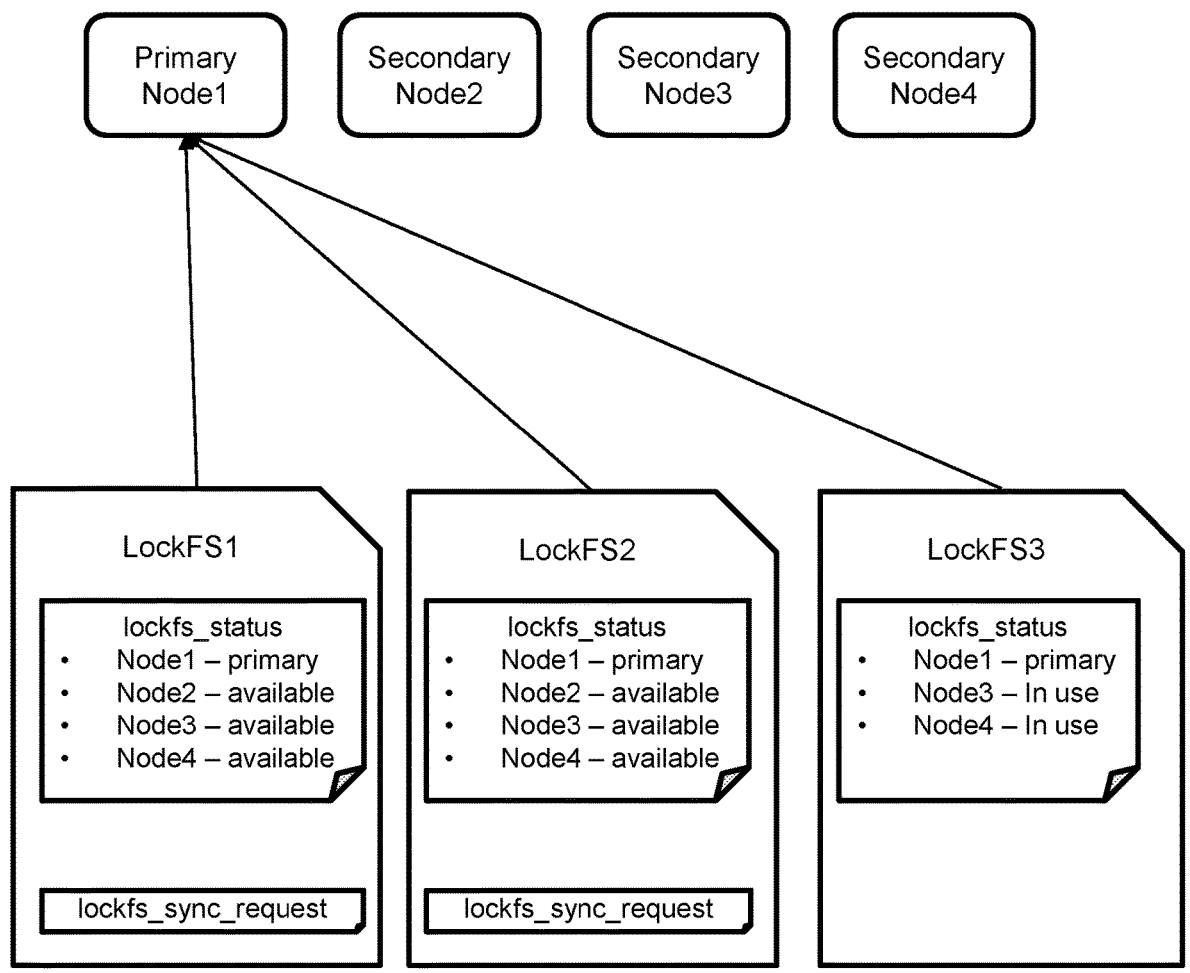
FIG. 9 illustrates the primary node selecting one of the available LockFSs for recovery.

FIG. 9 illustrates the primary node selecting one of the available LockFSs for recovery. Node3 and node4 have responded to the lockfs_status message by indicating that LockFS3 is in use and LockFS1 and LockFS2 are available. The primary node1 reads the response messages and uses those messages to select a new LockFS that is available to all nodes. If multiple LockFS copies are available to all nodes then a selection among those copies may be made in any of a wide variety of ways, including but not limited to random selection, round-robin, etc. In the illustrated example, LockFS1 and LockFS2 are available to all nodes and LockFS2 is selected by the primary node1.

Figure 10:
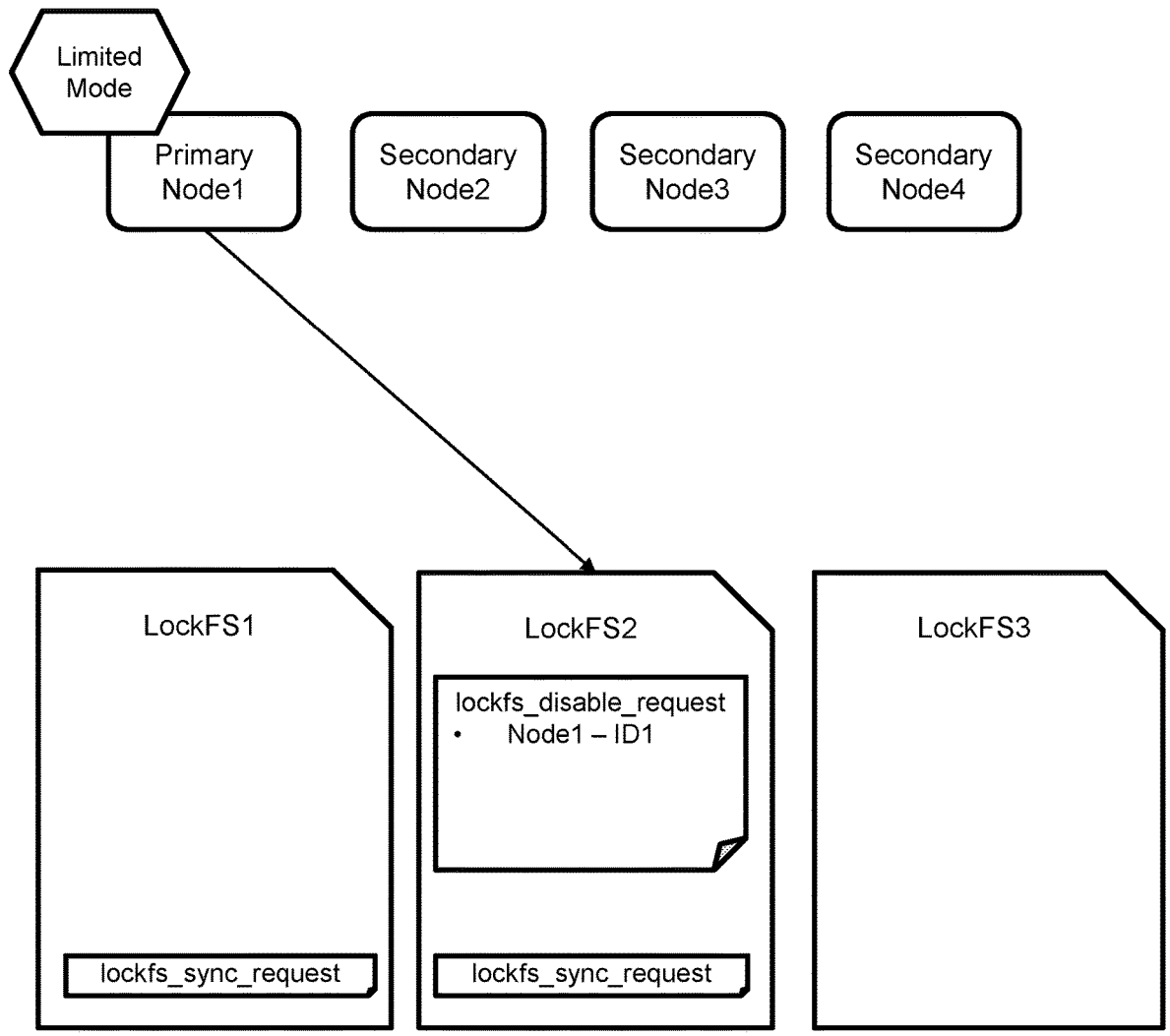
FIG. 10 illustrates the primary node sending requests to disable the LockFS on all nodes and limit functionality.

FIG. 10 illustrates the primary node sending a lockfs_disable_request to disable the LockFS on all nodes and limit functionality. The lockfs_disable_request message includes the primary node1 ID and a unique process ID. The lockfs_disable_request message is posted to the selected new LockFS copy, LockFS2. The primary node1 enters a limited functionality mode that disables operations that would conflict with changing the active LockFS copy.

Figure 11:
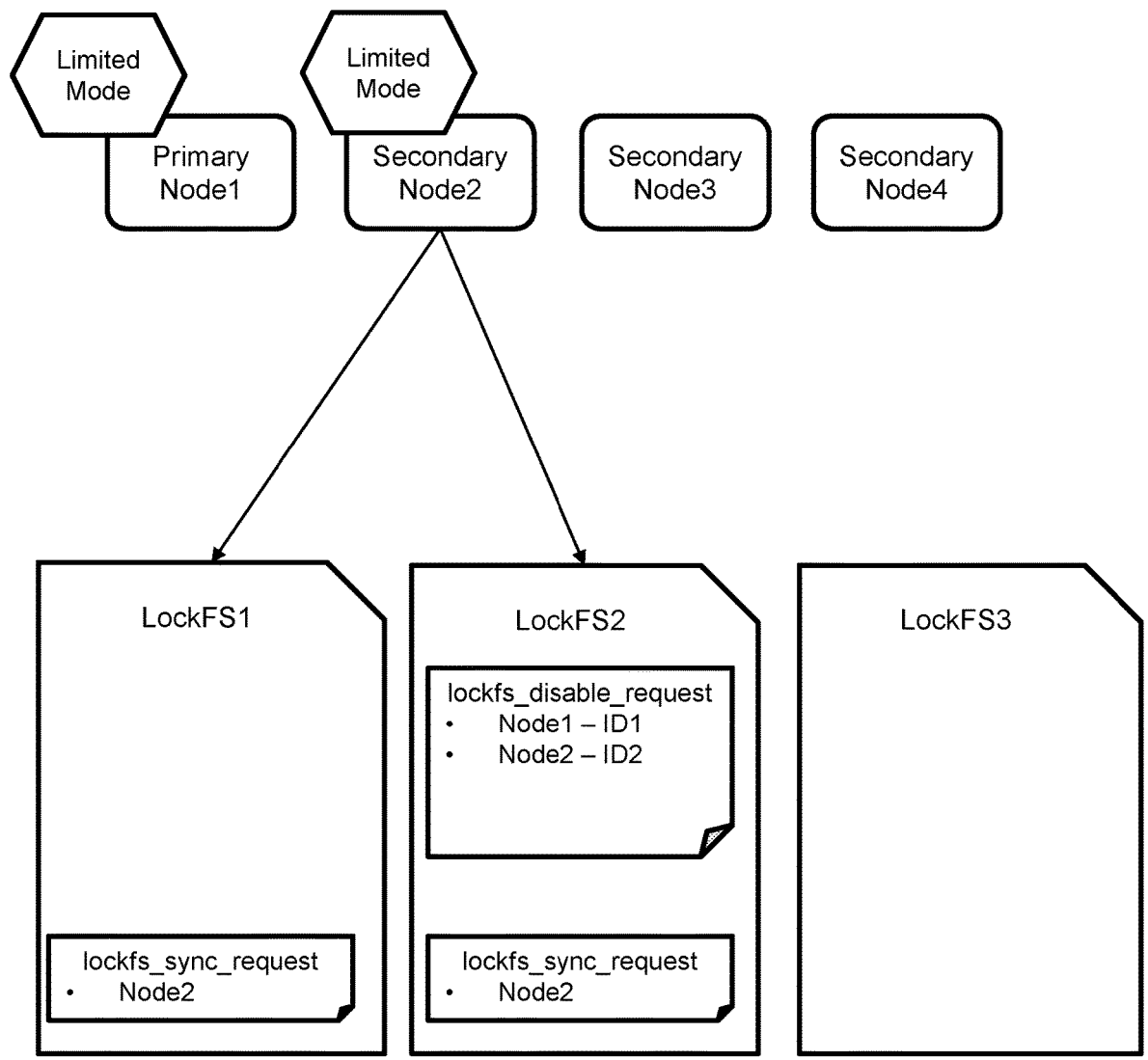
FIG. 11 illustrates a secondary node disabling LockFS and limiting functionality.
Figure 12:
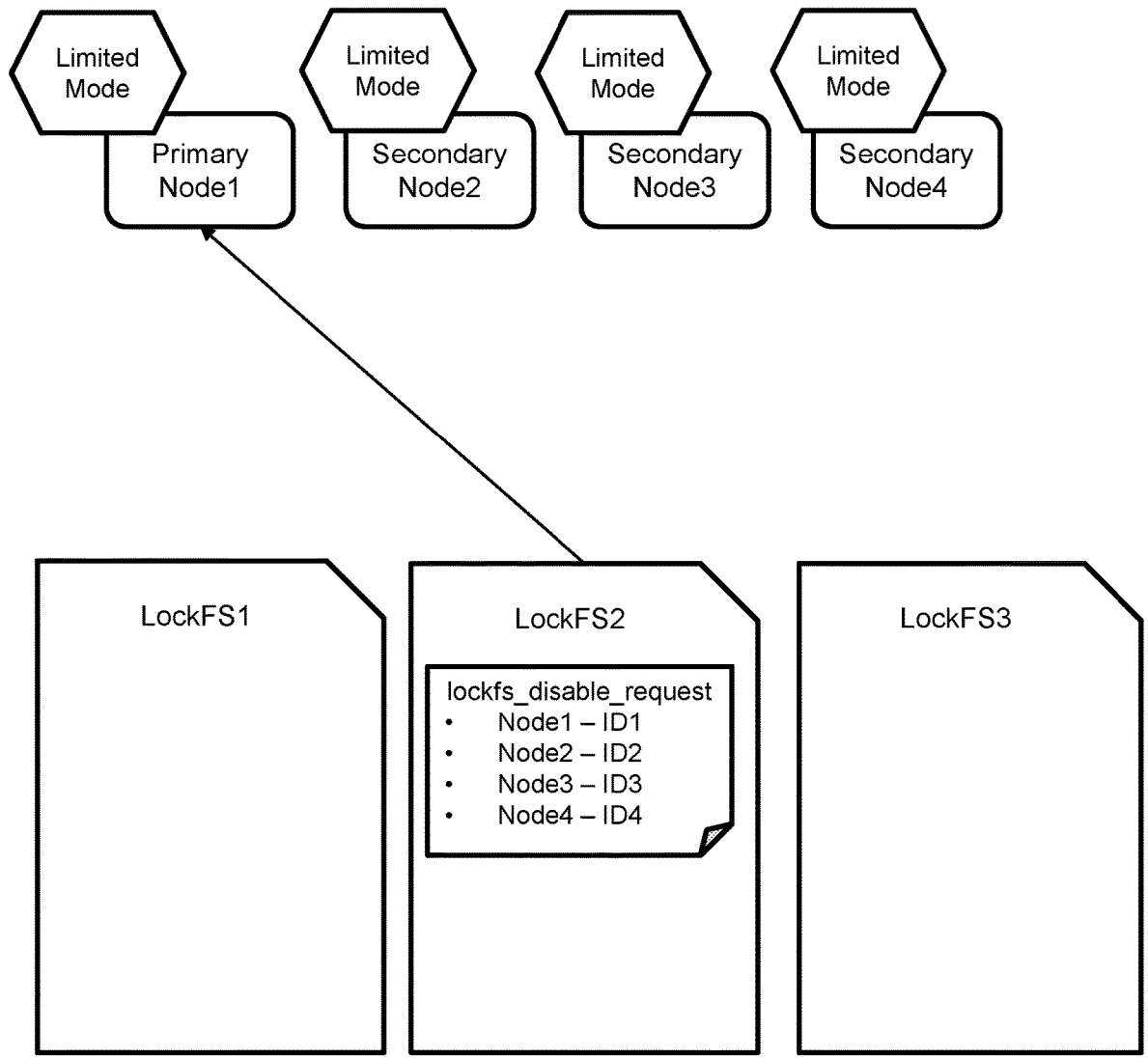
FIG. 12 illustrates the primary node waiting for all nodes to disable LockFS and limit functionality.

FIG. 11 illustrates a secondary node disabling LockFS and limiting functionality. In response to reading the lockfs_disable_request message, the secondary node ceases using the active LockFS3. The secondary node then enters the limited functionality mode and acknowledges receipt of the lockfs_disable_request message by posting a reply message to the selected new LockFS2. Responses to the lockfs_disable_request message by secondary node3 and secondary node4 are shown in FIG. 12. It should be noted that acknowledgement type messages could be posted by either writing a node ID to a file or deleting a node ID from a file.

FIG. 12 illustrates the primary node waiting for all nodes to disable LockFS and limit functionality. When all nodes have acknowledged receipt of the lockfs_disable_request message by posting replies to the selected new LockFS2, the primary node determines that all nodes have disabled the active LockFS and entered the limited functionality mode. When all nodes are working without using the active LockFS then it is safe to activate the new selected LockFS on all nodes.

Figure 13:
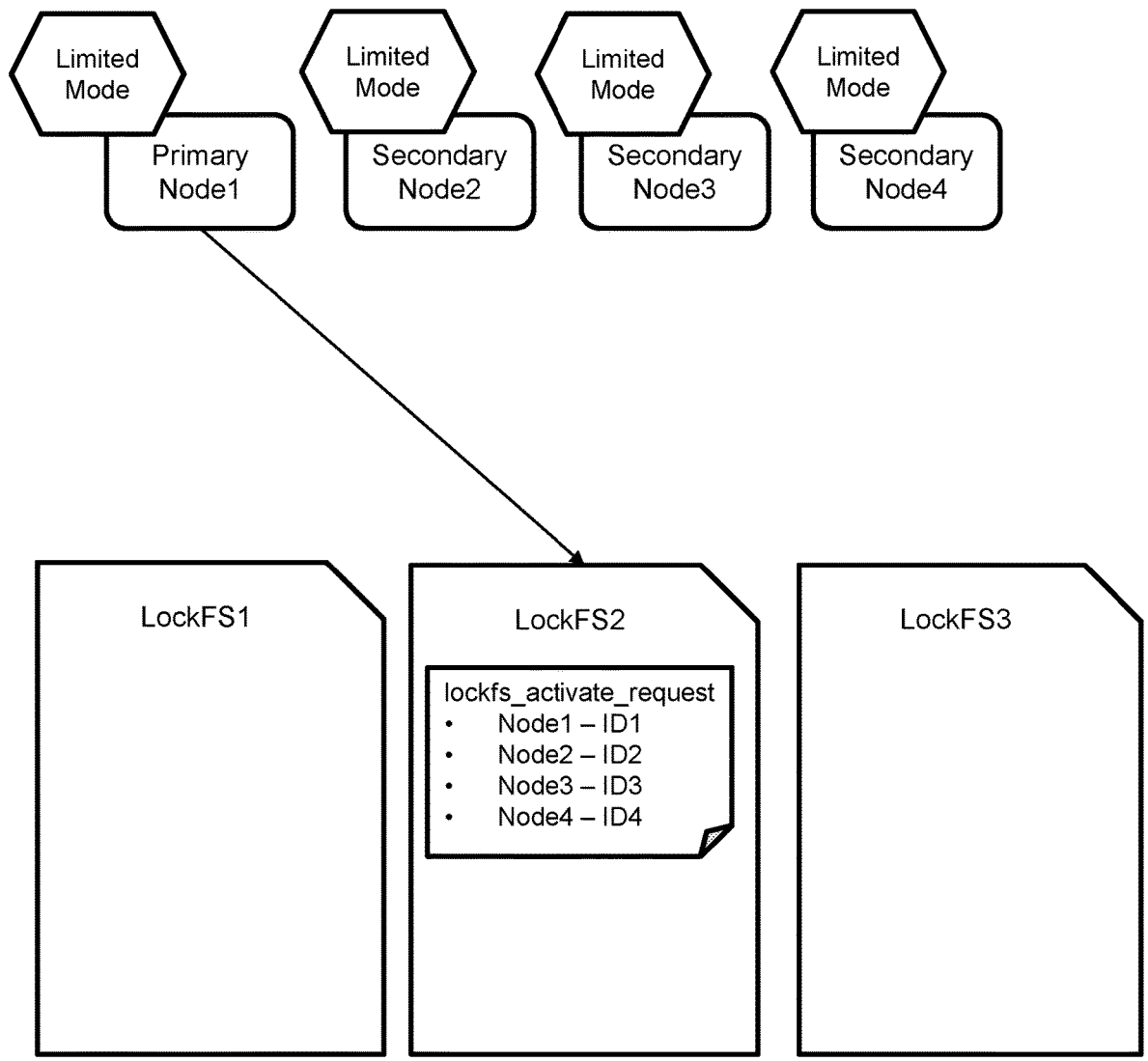
FIG. 13 illustrates the primary node creating a request to activate a selected LockFS.

In the case where a timeout occurs before the "lockfs_disable_request" is filled by all nodes, the primary node removes the lockfs_disable_request file, halts the current synchronization process, and attempts synchronization again after a defined delay. FIG. 13 illustrates the primary node creating a request to activate the selected new LockFS. After determining that all nodes have disabled the active LockFS and entered the limited functionality mode, the primary node posts a lockfs_activate_request message to the selected new LockFS2. The lockfs_activate_request message indicates the secondary nodes that are intended recipients of the message.

Figure 14:
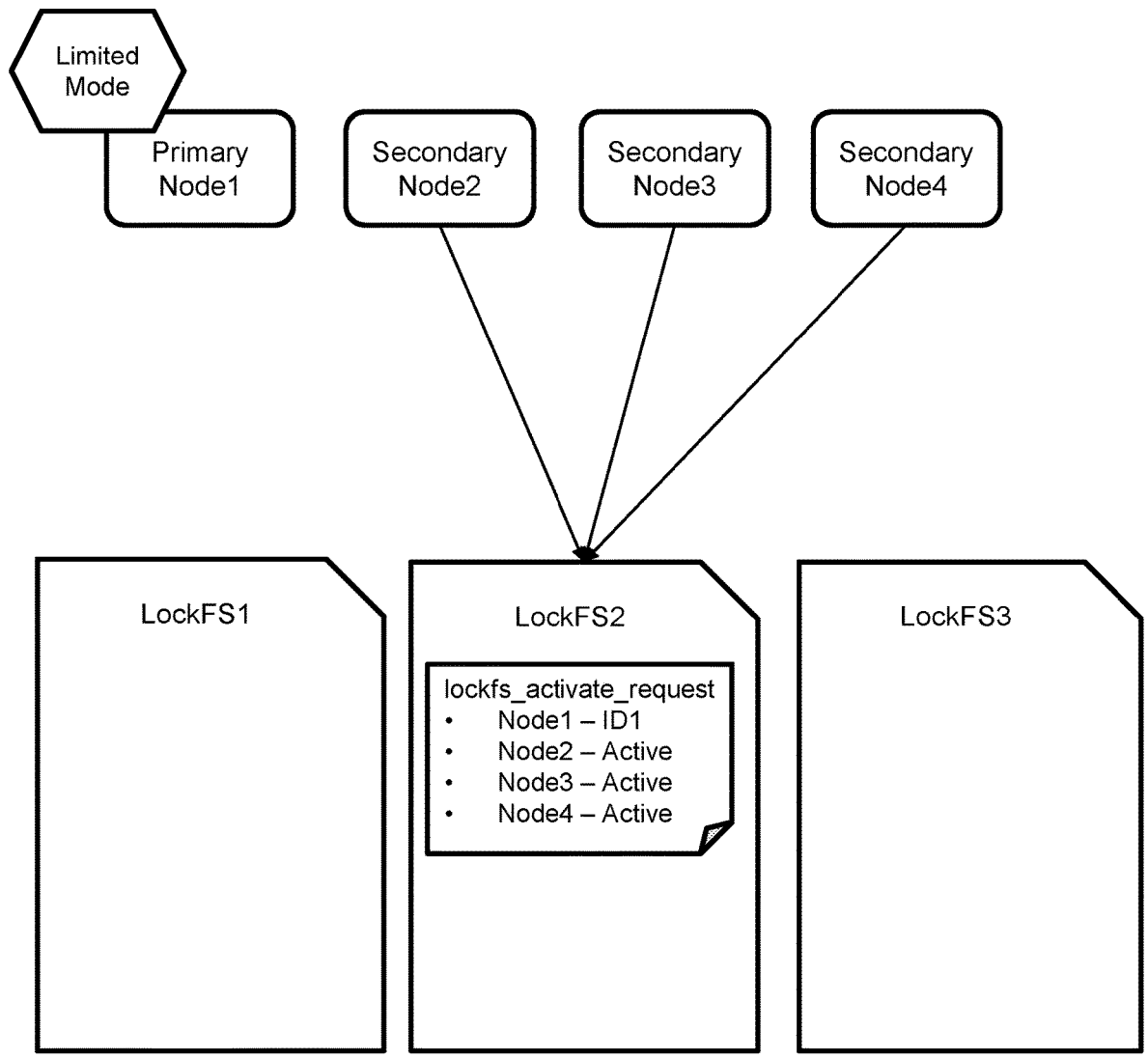
FIG. 14 illustrates the secondary nodes enabling the selected LockFS.

FIG. 14 illustrates the secondary nodes enabling the selected LockFS. In response to reading the lockfs_activate_request message, each secondary node exits the limited functionality mode and begins using the selected new LockFS copy, which becomes the active copy. Further, each secondary node posts a message to the active LockFS copy indicating that the selected new LockFS has been activated. When a secondary node detects that the "lockfs_disable_request" file has been removed, the node looks for and reads a "lockfs_activate_request" file and checks that the stored unique process ID for the current node matches the actual unique process ID. If the IDs match, then the node replaces the ID in "lockfs_activate_request" with the word "Active" and starts using the new LockFS. If the IDs do not match, then the node replaces its ID in "lockfs_activate_request" with the word "Error" and continues working in limited mode until the next synchronization. To prevent persistence of "lockfs_activate_request" and "lockfs_disable_request", which may occur where the primary node loses LockFS connectivity at the end of synchronization, the secondary node removes those files after the files have persisted in filesystem longer than a defined period of time. The secondary node then continues working in its current state, whether LockFS activation occurred or not.

Figure 15:
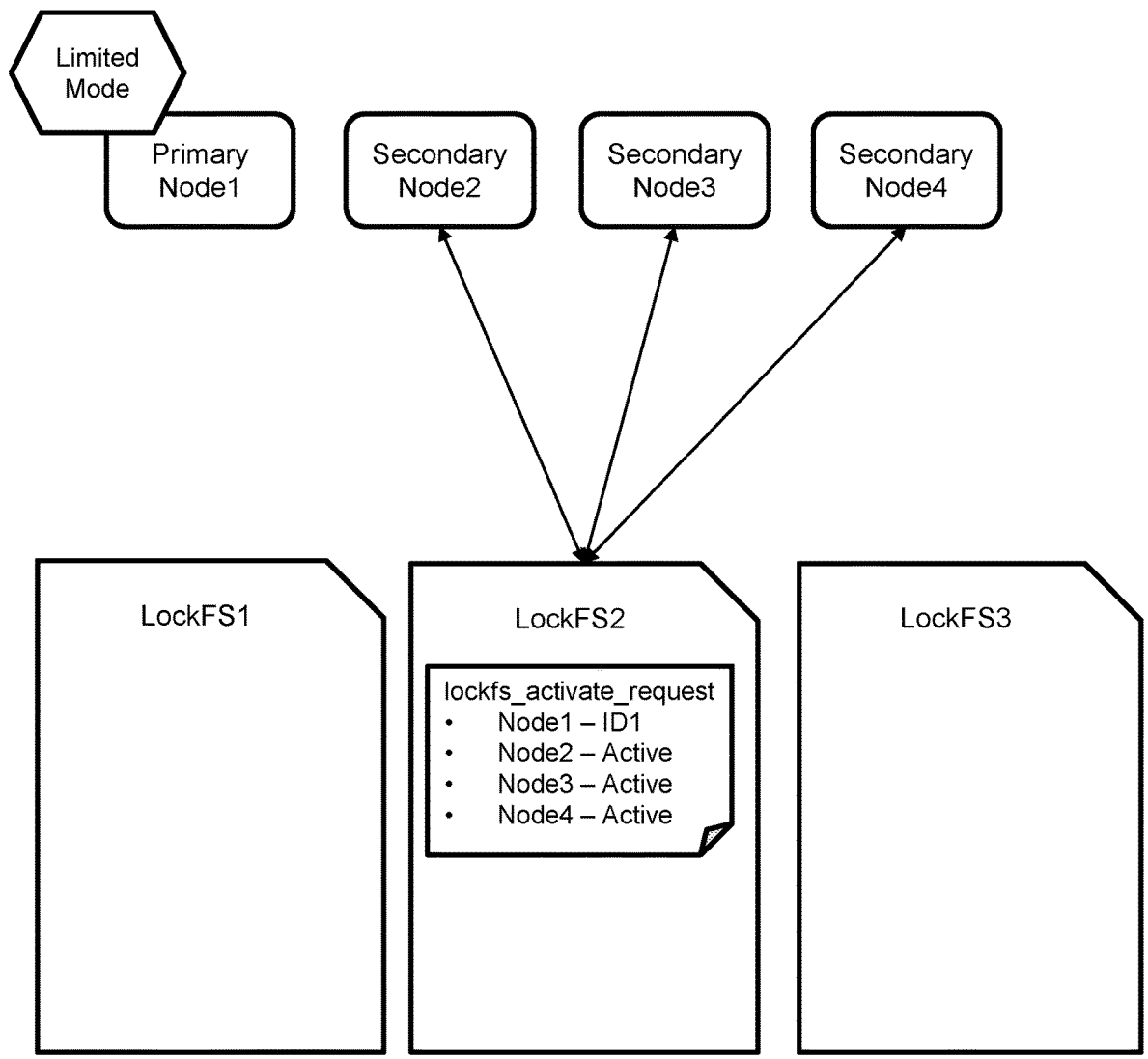
FIG. 15 illustrates the primary node waiting for all nodes to start using the new LockFS.

FIG. 15 illustrates the primary node waiting for all nodes to start using the new LockFS. When all of the nodes listed as intended recipients of the lockfs_activate_request message have posted Active messages to the active LockFS copy indicating that the selected new LockFS has been activated then the primary node1 determines that all nodes have started using the new LockFS2. If any secondary nodes posted Error messages or a timeout occurred, then the lockfs_activate_request file is deleted and synchronization is reinitialized. Deletion of the file is normally performed by the primary node but is performed by a secondary node when the primary node fails to delete the file.

Figure 16:
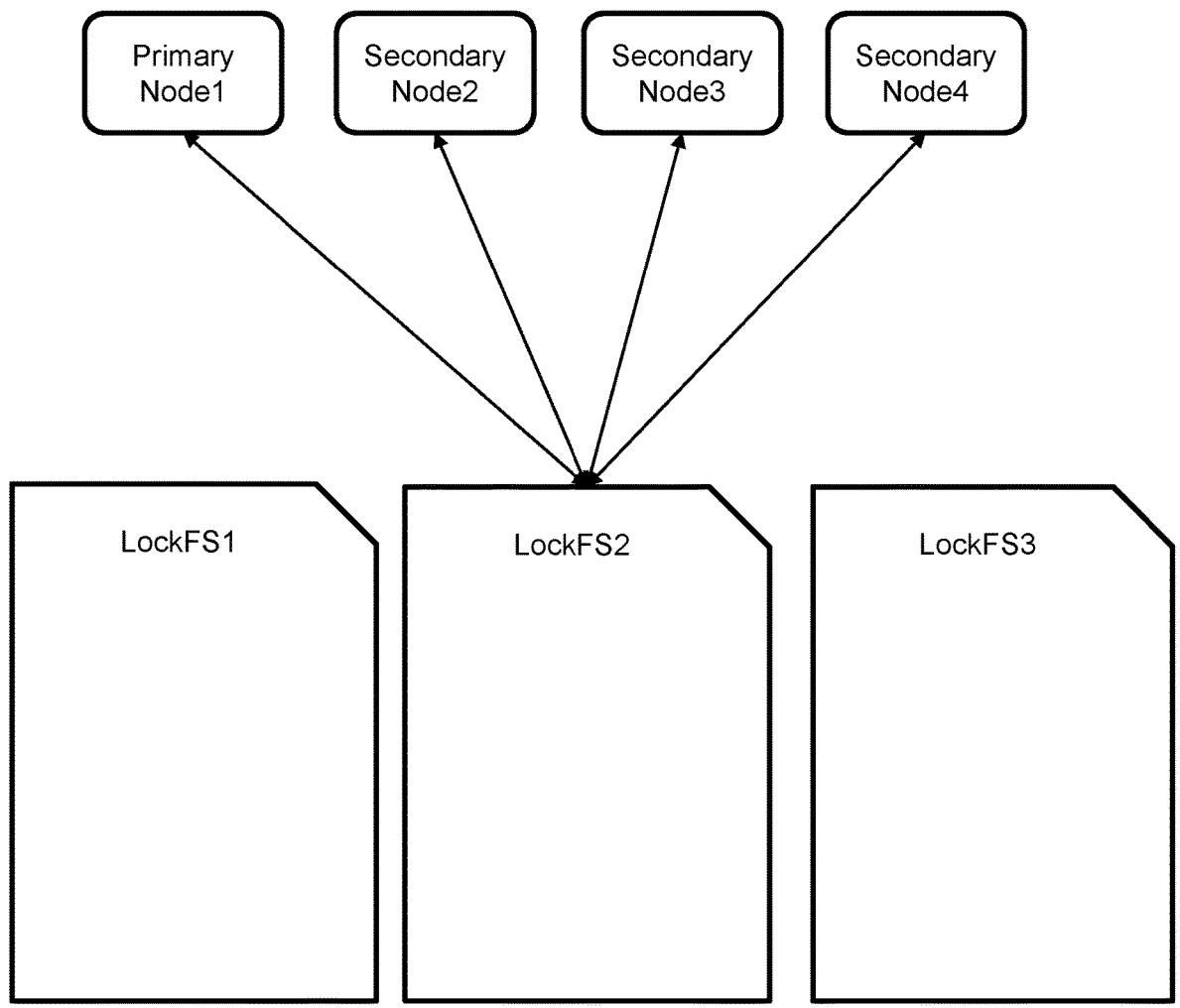
FIG. 16 illustrates the primary node enabling the new lockFS, thereby completing automatic recovery.

FIG. 16 illustrates the primary node enabling the new lockFS, thereby completing automatic recovery. All nodes, including the primary node1, have exited the limited functionality mode and are using LockFS2. The formerly active LockFS3 that prompted the recovery process due to inaccessibility may become reachable by all nodes following repairs and can then be eligible for selection in a future recovery operation.

Several different features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A virtual tape library system, comprising:
   a primary virtual tape server comprising a non-transitory memory with program code configured to:
      select an active copy of a shared locking filesystem from a plurality of copies of the shared locking filesystem, the active copy of the shared locking filesystem and the plurality of copies of the shared locking filesystem each being stored on different non-volatile drives;
      receive tape drive utility access commands;
      responsive to the tape drive utility access commands, use the active copy of the shared locking filesystem to generate corresponding input-output commands to access storage resources; and
   a plurality of secondary virtual tape servers comprising non-transitory memory with program code configured to:
      receive tape drive utility access commands;
      responsive to the tape drive utility access commands, use the active copy of the shared locking filesystem selected by the primary virtual tape server to generate corresponding input-output commands to access storage resources; and
      signal to the primary virtual tape server responsive to the active copy of the shared locking filesystem becoming unreachable from the non-volatile drive on which the active copy of the shared locking filesystem is stored, the signaling prompting one of the plurality of copies of the shared locking filesystem to replace the active copy of the shared locking filesystem to generate input-output commands to access storage resources;
   wherein ones of the secondary virtual tape servers are configured to signal that the active copy of the shared locking filesystem has become unreachable by posting a synchronization request to at least one of the copies of the shared locking filesystem that is reachable;
   wherein the primary virtual tape server is responsive to the synchronization request to post status request messages to all reachable copies of the shared locking filesystem; and
   wherein the secondary virtual tape servers are responsive to the status request messages to post status messages to reachable copies of the shared locking filesystem indicating availability, including use as the active copy of the shared locking filesystem.

2. The virtual tape library system of claim 1 wherein the primary node is responsive to the status messages to select a different one of the copies of the shared locking filesystem as the active copy.

3. The virtual tape library system of claim 2 wherein the primary node posts a disable request to the different one of the copies of the shared locking filesystem.

4. The virtual tape library system of claim 3 wherein the secondary nodes are responsive to the disable request to enter a limited functionality node and cease use of the active copy of the shared locking filesystem.

5. The virtual tape library system of claim 4 wherein the primary node posts an activate request to the different one of the copies of the shared locking filesystem.

6. The virtual tape library system of claim 5 wherein the secondary nodes are responsive to the activate request to exit the limited functionality node and begin use of the different one of the copies of the shared locking filesystem as a new active copy of the shared locking filesystem.

7. A method for shared locking filesystem recovery in a virtual tape library system, comprising:
- a primary virtual tape server comprising a non-transitory memory with program code:
  - selecting an active copy of a shared locking filesystem from a plurality of copies of the shared locking filesystem, the active copy of the shared locking filesystem and the plurality of copies of the shared locking filesystem each being stored on different non-volatile drives;
  - receiving tape drive utility access commands;
  - responsive to the tape drive utility access commands, using the active copy of the shared locking filesystem for generating corresponding input-output commands to access storage resources; and
- a plurality of secondary virtual tape servers comprising non-transitory memory with program code:
  - receiving tape drive utility access commands; and
  - responsive to the tape drive utility access commands, using the active copy of the shared locking filesystem selected by the primary virtual tape server for generating corresponding input-output commands to access storage resources;
- at least one of the secondary virtual tape servers signaling to the primary virtual tape server responsive to the active copy of the shared locking filesystem becoming unreachable by posting a synchronization request to at least one of the copies of the shared locking filesystem that is reachable; and
- in response to the signaling by the at least one of the secondary virtual tape servers, the primary virtual tape server posting status request messages to all reachable copies of the shared locking filesystem responsive to the synchronization request, the secondary virtual tape servers posting status messages to reachable copies of the shared locking filesystem indicating availability, including use as the active copy of the shared locking filesystem, and the primary virtual tape server selecting a different one of the copies of the shared locking filesystem as a new active copy of the shared locking filesystem to replace the active copy of the shared locking filesystem for generating input-output commands to access storage resources.

8. The method of claim 7 comprising the primary node posting a disable request to the different one of the copies of the shared locking filesystem and the secondary nodes entering a limited functionality node and ceasing use of the active copy of the shared locking filesystem responsive to the disable request.

9. The method of claim 8 comprising the primary node posting an activate request to the different one of the copies of the shared locking filesystem and the secondary nodes exiting the limited functionality node and beginning use of the different one of the copies of the shared locking filesystem as a new active copy of the shared locking filesystem.

* * * * *